US012580925B2

(12) United States Patent
Singh et al.

(10) Patent No.: US 12,580,925 B2
(45) Date of Patent: Mar. 17, 2026

(54) DETERMINING SECURITY RISKS ASSOCIATED WITH AN ACCESS DESIGN BASED ON ACCESS HEALTH SCORES

(71) Applicant: AlertEnterprise, Inc., Fremont, CA (US)

(72) Inventors: Navjot Singh, Chandigarh (IN); Yogesh Ailawadi, Fremont, CA (US); Vikas Chauhan, Mountain House, CA (US)

(73) Assignee: AlertEnterprise, Inc., Fremont, CA (US)

( * ) Notice: Subject to any disclaimer, the term of this patent is extended or adjusted under 35 U.S.C. 154(b) by 209 days.

(21) Appl. No.: 18/416,593

(22) Filed: Jan. 18, 2024

(65) Prior Publication Data

US 2024/0430270 A1 Dec. 26, 2024

Related U.S. Application Data

(60) Provisional application No. 63/481,313, filed on Jan. 24, 2023.

(51) Int. Cl.
*H04L 9/40* (2022.01)
*G06Q 10/0635* (2023.01)

(52) U.S. Cl.
CPC ........ *H04L 63/105* (2013.01); *H04L 63/1433* (2013.01); *G06Q 10/0635* (2013.01)

(58) Field of Classification Search
CPC .................................................. G06Q 10/0635
See application file for complete search history.

(56) References Cited

U.S. PATENT DOCUMENTS

| | | | |
|---|---|---|---|
| 10,530,776 B2 * | 1/2020 | Grant .................... | H04L 63/101 |
| 2008/0288330 A1 * | 11/2008 | Hildebrand ...... | G06Q 10/06398 |
| | | | 705/7.42 |
| 2009/0138341 A1 * | 5/2009 | Mohan ............. | G06Q 10/06393 |
| | | | 705/7.39 |
| 2023/0186221 A1 * | 6/2023 | Qualls .................. | G06Q 10/105 |
| | | | 705/7.28 |

* cited by examiner

*Primary Examiner* — William J. Goodchild
(74) *Attorney, Agent, or Firm* — PERKINS COIE LLP

(57) ABSTRACT

A system automatically detects unnecessary reader access granted to identities and suggest changes required to bring down the security risk level of an organization. With ever increasing digitization of physical infrastructure, it is not possible to manually monitor and decide who should be able to access what and when, which makes it difficult to ensure that identities have access to just enough readers to fulfill their duties. The system makes sure that all the identities' access is monitored all the time and any vulnerabilities are detected and reported in time, in the form of health score, which is then used to recommend mitigation measures. The system leverages statistical algorithms to produce access recommendations and is replicable in the form of a software interface that can be used in any business/organization or structured work group where identities need to use readers to operate.

29 Claims, 10 Drawing Sheets

ALERTENTERPRISE      Home   Admin   Policy Engine   Recon   Reports & Dashboard   Access Design Controls   Settings   | ⊙ ❯ Pedro Herman Security Admin

Job Design Recommendations ⌇700
View and Manage Job Design Recommendations

+ Create Job Role Recommendation

| Existing Job Role | New Job Role |
|---|---|

| ☐ Job Role ID ⌇730 | Access ⌇740 | Target Health ⌇750 | Time | User Coverage | Drill Down |
|---|---|---|---|---|---|
| ☐ JBR-12345 | AC13, AC11, AC15 | 72% | 12/13/2022 16:33 | 1133356 | ⟹ |
| ☐ JBR-23456 | AC09, AC31, AC21 | 79% | 12/11/2022 17:32 | 341728 | ⟹ |
| ☐ JBR-34567 | AC79, AC19 | 89% | 12/10/2022 16:33 | 980245 | ⟹ |
| ☐ JBR-45678 | AC100 | 72% | 12/10/2022 18:45 | 189023 | ⟹ |
| ☐ JBR-56789 | AC64, AC02 | 72% | 12/10/2022 14:39 | 12345765 | ⟹ |
| ☐ JBR-67890 | AC31, AC24 | 80% | 12/07/2022 16:33 | 125093 | ⟹ |
| ☐ JBR-78901 ⌇720 | AC20, AC23 | 72% | 12/07/2022 16:33 | 100100 | ⟹ |
| ☐ JBR-89012 | AC02, AC45 | 72% | 12/07/2022 16:33 | 123321 | ⟹ |
| ☐ JBR-90123 | AC01, AC13 | 87% | 12/05/2022 16:33 | 332244 | ⟹ |
| ☐ JBR-10123 | AC77, AC13 | 75% | 11/30/2022 07:33 | 897650 | ⟹ |

*FIG. 7*

DETERMINING SECURITY RISKS ASSOCIATED WITH AN ACCESS DESIGN BASED ON ACCESS HEALTH SCORES

CROSS-REFERENCE TO RELATED APPLICATIONS

This application claims priority to U.S. Provisional Patent Application Ser. No. 63/481,313, filed Jan. 24, 2023, which application is incorporated herein in its entirety by this reference thereto.

FIELD

Various of the disclosed embodiments concern security and, more specifically, to methods and systems that determine security risks based on health scores.

BACKGROUND

The physical world is being digitized. Access to secure information is guarded behind closed doors that can be opened by presenting an appropriate authentication, such as a magnetic key card. When a person joins a company and assumes a particular role, such as a role of a bank teller or bank manager, based on that role, the person is given certain privileges, i.e. access, in the physical world. That access dictates which doors they can open, which buildings they can go to, and which information they can consume. Currently, it is difficult to determine if access given to various people in an organization is optimal, namely, determining whether people are getting too much access to information they do not need. Giving too much access to people who do not need such access creates security risks for the company by increasing a number of attack points within the organization.

SUMMARY

Embodiments of the invention automatically detect unnecessary reader access granted to identities and suggests changes required to bring the overall exposure and risk level of an organization down to manageable levels. With ever-increasing digitization of physical infrastructure, it is not possible to manually monitor and decide who should be able to access what and when, which makes it difficult to ensure that identities have access to just enough readers to fulfill their duties. The disclosed system makes sure that all the identities' access is monitored all the time and any vulnerabilities are detected and reported in time, in the form of health score, which is then used to recommend mitigation measures. Statistical algorithms are used to produce access recommendations. A user interface is provided that can be used in any business/organization or structured work group where identities need to use readers to operate.

BRIEF DESCRIPTION OF THE DRAWINGS

FIG. 7 shows one type of suggestion, namely, creating a new job role grouping for more than one recommended access;

DETAILED DESCRIPTION

Embodiments of the invention use inferences from data which represent asset usage patterns by identities. This data, when leveraged by linear optimization and similarity algorithms, leads to a smart decision support system served through a software interface that suggests granting or revoking access permission of certain assets to identities in the right proportion to minimize the risk and maximize the use of assets.

Figure 1:
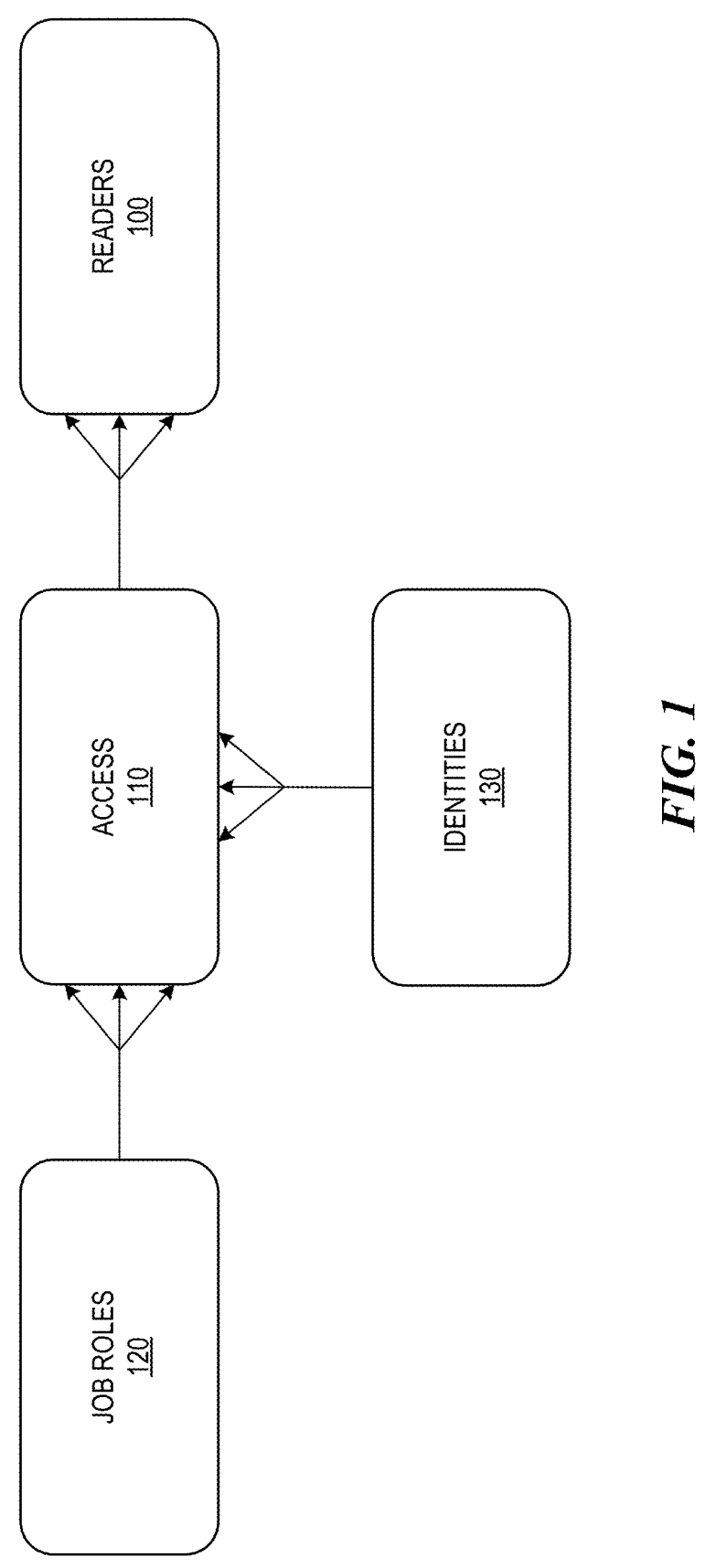
FIG. 1 shows the relationship between readers, access, and job roles.

FIG. 1 shows the relationship between readers, access, and job roles. This hierarchical structure helps to design the access controls in a systemic way. To create the access design controls solution the readers 100 are organized into groups created by nature of duties of identities 130 who use them. These groups are termed as access levels or access 110, and access levels are further organized into job roles 120. There can be one or more job roles 120 in an organization, there can be one or more access 110 in a job role, and there can be one or more readers 100 in an access.

The readers 100 can be devices, such as electronic devices, that read a presented identifier and determine whether the presented identifier is authorized to unlock content guarded by the reader 100. The readers can use knowledge, possession, and/or biometrics to authorize and identify. Knowledge can include knowledge of a password and possession can include possession of a key, while biometrics can include fingerprints, retina scans, voice authentication, etc. Once the identity is authenticated, the readers can cause the opening of a door, access to privileged information, ability to perform secured operations, etc. The readers can be employed in various settings such as corporations, hospitals, schools, online authentication, etc.

Figure 2:
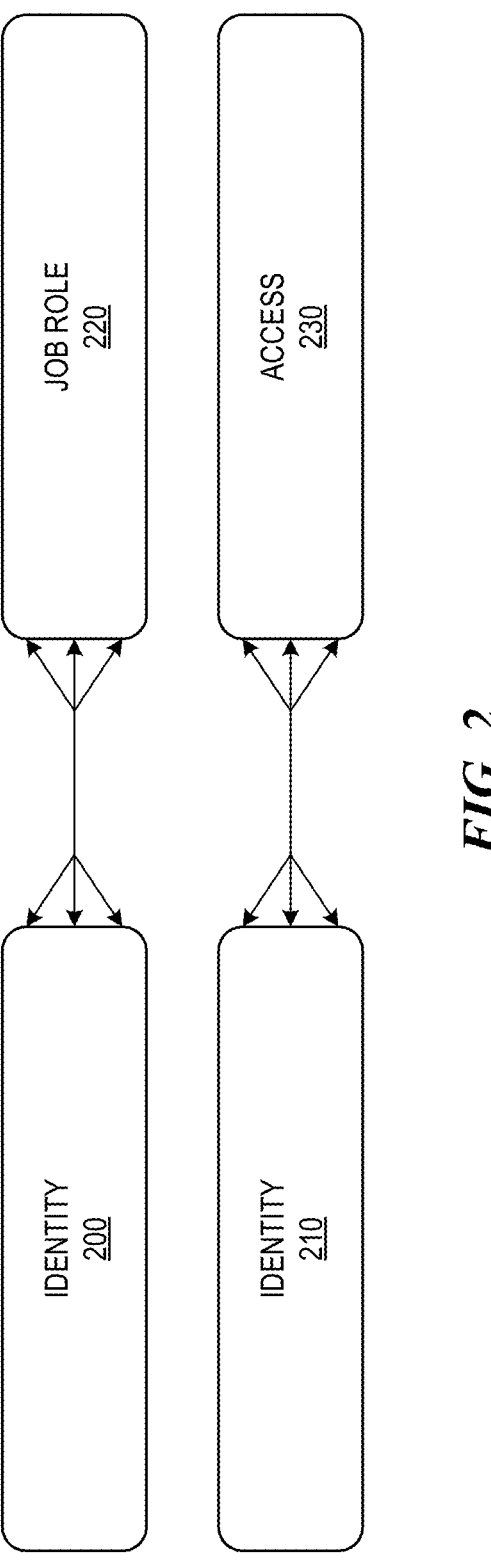
FIG. 2 shows how job roles and accesses can be assigned to identities according to varying needs of granting privileges to readers in a systemic way.

FIG. 2 shows how job roles and accesses can be assigned to identities as per varying needs of granting privileges to readers in a systemic way. The system can grant the privileges to identities 200, 210 in two ways, e.g. by assigning job roles 220 or assigning access 230. One identity 200, 210 can have more than one job role 220 and vice versa. Similarly, one identity 200, 210 can have more than one access 230 and vice versa. The identity can be associated with a person, a program, or any entity that needs access to protected content.

Those skilled in the art will appreciate that while optimizing job roles by rearranging, removing, or adding access to a job role is discussed herein, the same approach can be taken in embodiments of the invention to optimize access by rearranging, removing, or adding components of job roles, e.g. readers.

Further, while embodiments of the invention concern an approach to optimizing job roles by adjusting access and optimizing access by adjusting readers, the reader is provided as an example. For purposes of the discussion herein the reader refers to any access point, such as door, biometric scanner, RFID reader, key card reader, digital password pin pad, or any other similar point. Similarly, access is provided as an example and refers to various entities, such as access level, building zone, network permissions, and many more; and job role refers to any position, attribute, or combination of attributes which represents a set of responsibilities or duties as an example.

Figure 3:
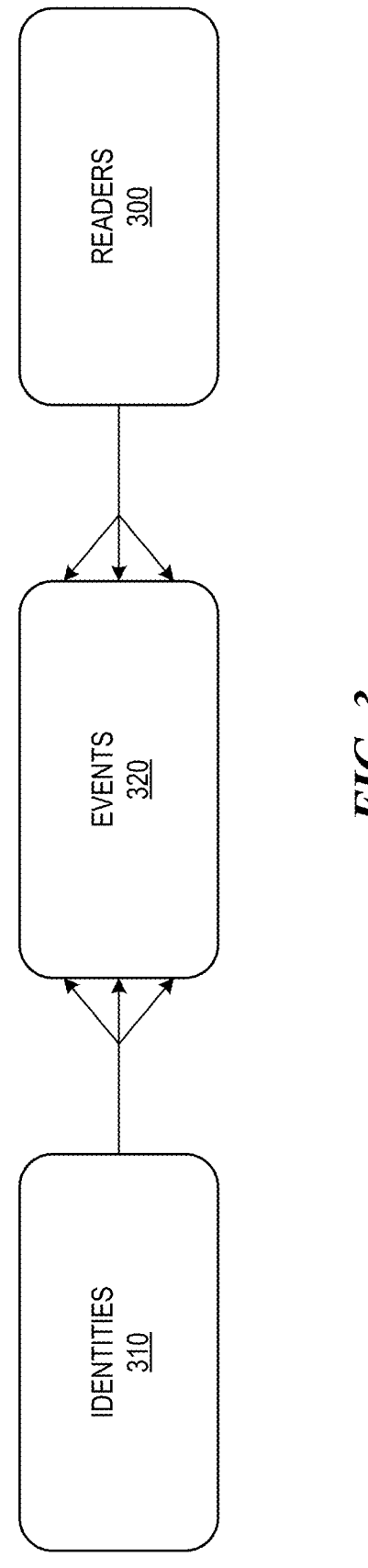
FIG. 3 shows how activity of an identity on a reader is captured in the form of a log which is then stored as event.

FIG. 3 shows how activity of an identity on a reader is captured in the form of log, which is then stored as event. There can be multiple logs for one identity and one reader. Every time a reader 300 is accessed by an identity 310, it creates a digital log, which is called an event 320. Usage levels of readers, access, and job roles are quantified through events. Events are used to calculate a health score. The health score of a job role/access is directly proportional to its usage levels ranging from 0-100. Those skilled in the art will appreciate that the health score need not be displayed on a scale of 0-100 but may be displayed in any desired format that communicates a range of values, e.g. different colors within a range of colors, etc.

Taking inference from this data, the system generates recommendations to rearrange the accesses in the job roles to improve the health score of the job roles by:

1) Removing or adding an access to a job role; or
2) Creating a new job role grouping more than one recommended access.

The system optimizes the exposure and risk level by making the necessary shuffling of access in a job role where health score is used as a gauge. The system prevents an identity from obtaining permissions to use assets that they do not need to use. The information is provided to the end user in the form of machine learning (ML)-based recommendations.

The recommendations are created by the statistical layer based upon the best case scenario with an objective to maximize the health score of entities. Some important steps involved are generating embeddings, studying the latent space, generative model training, and linear optimization based upon embeddings. This statistical layer acts as a black box to the overall system while more details on the above mentioned components are shared below in the 'Insights on statistical layer' section of this disclosure.

The recommendations' raw content is generated by statistical layer, e.g. which entity to change, what is the change and what would be the benefit. This raw data is combined with the text template stored in the database and is served in the form of natural language recommendations to the end user.

As with recommendations to optimize health scores of job roles, the system can also generate recommendations to optimize health scores of accesses by:

1) Removing or adding new readers to the accesses; or
2) Creating new access by grouping more than one recommended reader.

In other words, in an embodiment of the invention the system can generate two types of recommendations at each level, i.e. job role and access recommendations. Those skilled in the art will appreciate that other types and numbers of recommendations may be provided.

Figure 4A:
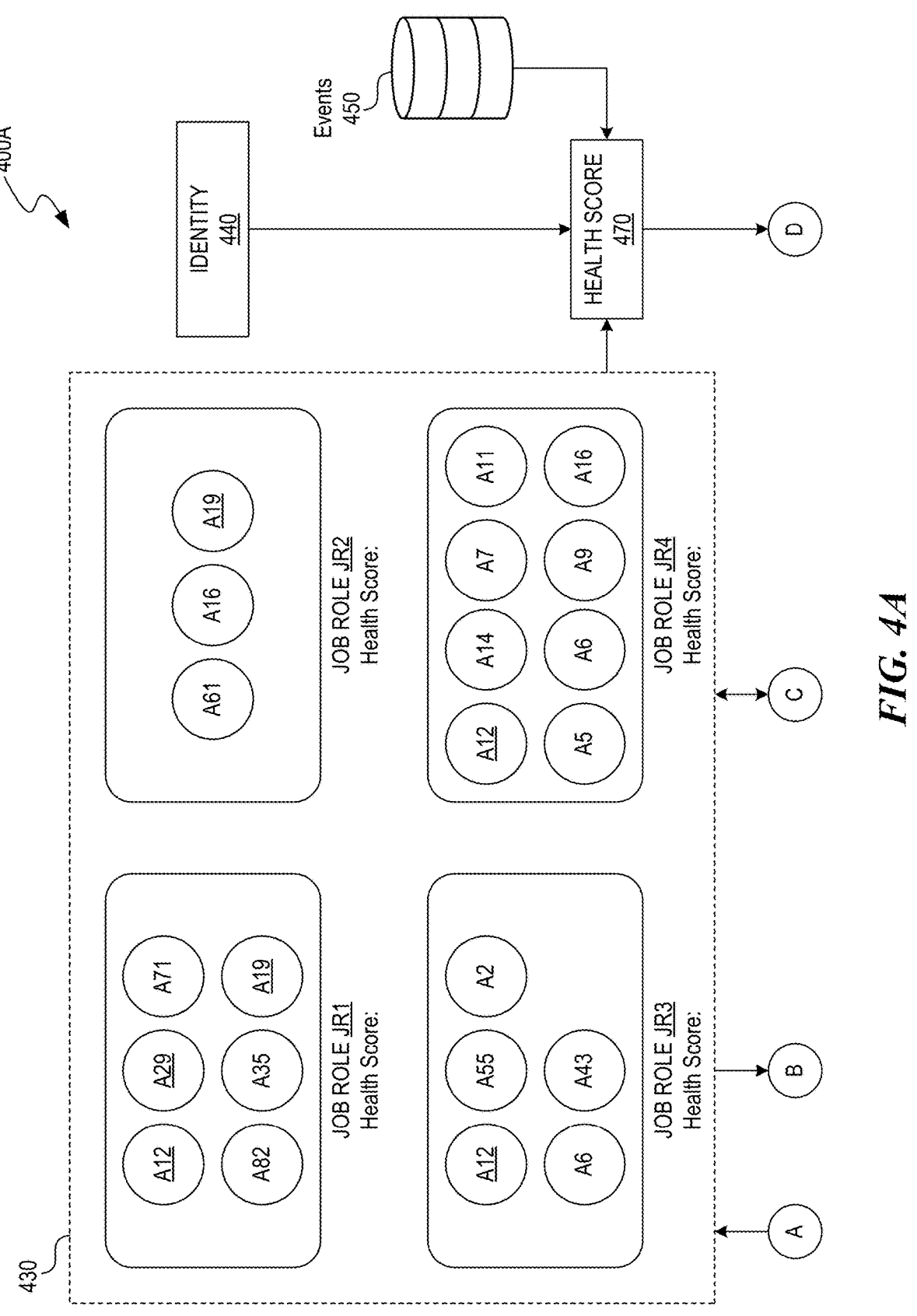
FIGS. 4A and 4B show a system that includes components working collaboratively to calculate health score and show recommendations to maximize the health score.
Figure 4B:
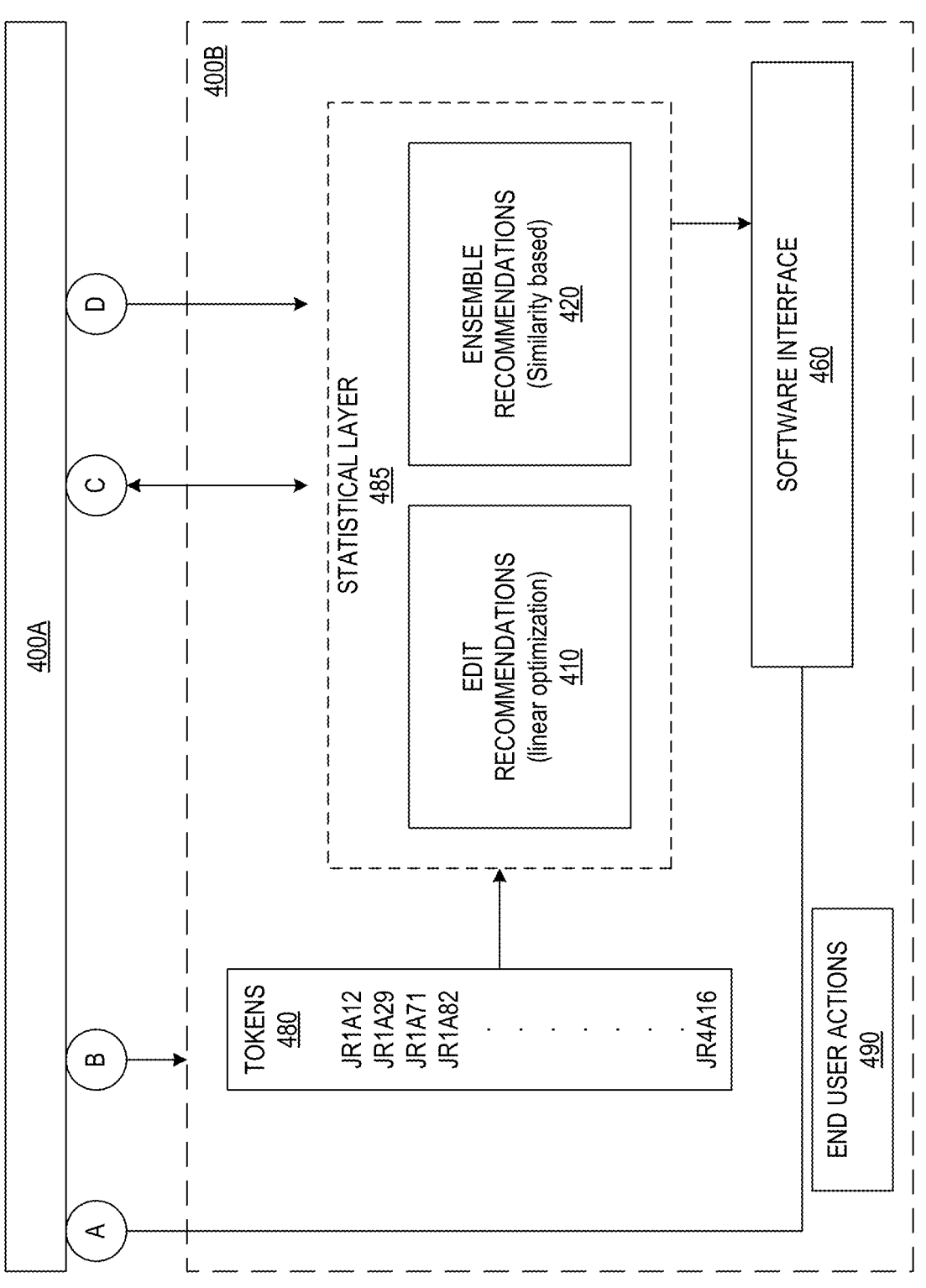

FIGS. 4A and 4B show a system 400A-B that includes components working collaboratively to calculate a health score and show recommendations to maximize the health score. FIGS. 4A and 4B show another type of suggestion, namely granting or revoking a reader's access. The initial source of data is job role data 430, identity data 440, and events data 450 (see FIG. 4A), while the final outcome is served in the form of a software interface 460 (see FIG. 4B).

The health score ("score") 470 is a quantified representation of the level up to which the current access is being used by the identities 440. The score 470 is calculated using job role 430, access A12, A19, A29 (only three are labeled in FIG. 4A for brevity), events 450, and identity data 440. The events data 450 record the recency and frequency of access usage, so any case where an identity 440 has not used the access for more than the threshold period, e.g. 180 days by default, the system 400A-B categorizes the access A12, A19, A29 as non-active usage and generates a lower health score 470 for nonactive usage, as described below. This helps the system 400A-B to calculate the proportion of active usage in percentage form, which ultimately is the health score of a specific access.

Increasing health score manually is not technically possible as its basis is recency and frequency of events. There is a preferred way of determining the health score in the core approach because this is also important to maintain the integrity of the system by preserving the right to update the health score for only core processes. If a user wants to adjust the health score they must change the structure of the access design in their organization, e.g. manually adjust the composition of readers which make access and composition of accesses which make job roles.

The system 400A-B can calculate an access' specific health score. The system 400A-B averages the health score for each access A12, A19, A29 in a job role 430 to calculate the job role's health score 470. For example, access A12 may have a score of 71, but access A19 may have a score of just 20, so the system 400A-B suggests removing the access that has the lesser score, e.g. A19, so that the overall job role JR2 health score improves.

The scale of the health score is 0 to 100 where 0 means worst and 100 means best case scenario/desired state. In embodiments of the invention, a method to calculate health score is as follows:

Reader level: total number of identities who have used the reader at least once in threshold period (180 days by default)/total number of identities who have been authorized to use the reader in respective access.

Access level: In case of an access, the summation of health score of all the readers is calculated and is divided by the number of readers in that access.

Job role: Job role consists of multiple accesses hence summation of health score of all the accesses is calculated and then divided by the total number of access in that job role.

The health score 470 is a single quantifiable number for every job role JR1-4. To determine the health of the organization, the system 400A-B can average health scores 470 of all job roles JR1-4. For example, JR1 has a 54% health score, JR2 has a 35% health score, JR3 has a 74% health score, and JR4 has a 74% health score. The system 400A-B can average all of the health scores to obtain a total health score in that organization. For example, the average health score in the organization including job roles JR1-4 is 59%.

Tokens 480 are obtained from job role 430 and access A12, A19, A29 combinations. It is possible to have same access in different job roles or the same reader in different accesses. They can have their respective health scores in their parent entity, e.g. access A12 can have score of 54% in job role JR4 and 90% in job role JR6. To study the health score of an access with respect to its parent entity, e.g. job role tokens are used which are strings that are created by concatenating the names of job role and access level. In above example the token JR4A12 has a health score of 54% while token JR6A12 has a health score of 90%.

For example, token 480A among the tokens 480 includes the job role JR1 and the corresponding access A12. The tokens 480 help monitor health of an access A12 with respect to a particular job role JR1. These tokens 480, access data A12, A19, A29, and the health score 470 are fed to the statistical layer 485, which recommends changes such as add or remove an access from a job role or design a new job role to maximize the respective health scores. The statistical layer 485 optimizes the resultant health score for the tokens 480. The technique used to optimize is linear optimization which is an established scientific way to optimize (minimize or maximize) a function based upon the given inputs and constraints. The section 'Insights on statistical layer' below contains more information on the four important phases of statistical layer although the system considers the statistical layer as black box which provides output for a given input in the same format (tokens) in all the cases. Using linear optimization and produces sample recommendations. The recommendations' raw content is generated by the statistical layer, e.g. which entity to change, what is the change and what would be the benefit. This raw data is combined with the text template stored in the database and is served in the form of natural language recommendations to the end user as follows:

Remove access A29 from job role JR1 to increase its health score from 54 to 67.

Remove access A19 from job role JR2 to improve its health 35 to 76.

Remove access A12 from job role JR4 to improve its health from 74 to 77.

Group access A12 and access A29 to form a new job role JR46 with health score 65.

A goal of statistical layer is to maximize the health score of entities (access and job role) by adjusting and creating the structure of the entities. It recommends those changes and also the benefit of implementing those recommendations. Regarding the components and technique of statistical layer more information is enclosed in the section below 'Insights on statistical layer. The statistical layer acts as request/ response black box for the system.

In the examples above, because it is known that the health score of a job role is the average of health scores of all the accesses present in the job role, removing a low score access increases the score for the job role.

In some cases, two accesses such as A12 and A29 may be coupled. For example, access A29 can only be reached after access A12 has authorized the identity. The system can keep a table of coupled accesses A12, A29. In such a case, if the system 400A-B recommends removal of the access A12 from a job role JR1-4, the system also recommends removal of the access A29.

User actions 490, including approving the sample recommendations, are sent back to the job role repository 430 in the form of commands, and changes are made in respective job roles JR1-4. This improves median health score of job roles JR1-4 and hence reduces the risk levels of an organization from unnecessary privilege, which could otherwise lead to insider threats. The solution components are generic in nature and can be used as per need and size of the organization and can be implemented as a software through web, mobile, or API interface.

The nature of the generic solution components is as follows:

Events, identity information, job roles, accesses, tokens, and health score are stored in the database.

Statistical layer is a script, e.g. Python programming language which runs ML models and serves as request/ response block.

The software interface is a sample implementation of the system for the end user and serves recommendations and collects user's feedback on those recommendations to finally execute the actions on the database. It lies in the form of compiled software code files to be executed in the software platform environment, e.g. Java code.

The statistical layer 485 can include two types of subsystems 410, 420 responsible for generating the suggestions for job roles and assemble those to show the optimization recommendations to the end user to maximize the health score. There are three major steps that take place in this part:

1) Classification and ranking of high-risk job roles. The job roles that have the lowest health scores and involve sensitive access and readers are ranked higher so that while statistically managing the trade-off they can be prioritized for design optimizations.

2) Edit recommendations stage. This step finalizes the removal and addition recommendations based upon the closest matches of job roles and considers the ranking mentioned in step 1 and ensemble algorithms.

3) The similarity algorithm finds the best groups based upon access definition and historical usage. The similarity algorithm quantifies the likeness in meaning between two units of data leveraging tokens in this case. It is measured by analyzing the semantic relationships between entities (job roles and accesses) leveraging access and events data. There can be contextual or conceptual associations.

The goal is to provide a more nuanced measure of similarity beyond literal mapping in the core definition of access design in an organization, e.g. A12 and A14 are similar to each other because anyone using one has a tendency to use another. For example, where a user is also using A20, if we have A20 and A12 in a job role, the job role is optimized if we add A14 as well. This example covers three dimensions but the statistical layer can consider hundreds of dimensions while embedding and can find precise similarity by leveraging that data in similarity algorithms. One example of default algorithm is BERT (Bidirectional Encoder Representations from Transformers) but it is not limited to only that. The core idea is to use a similarity algorithm which suits an organization's needs.

The access design controls as described above can be implemented at two levels described as follows:

1) Job Role Design. In this level, the system can edit or create accesses to optimize job role design to achieve maximum health score for job roles.

2) Access Design. When the system optimizes an access, it means the system 400A-B is either editing the access to adjust the readers in it or the system is creating new accesses by grouping readers based upon recommendations generated by statistical layer of the solution. This solution is exactly the same as job role design in terms of algorithm, but the level at which it is implemented changes. The system can edit or create accesses, i.e. access levels to optimize access design, to achieve maximum health score for accesses.

Figure 5:
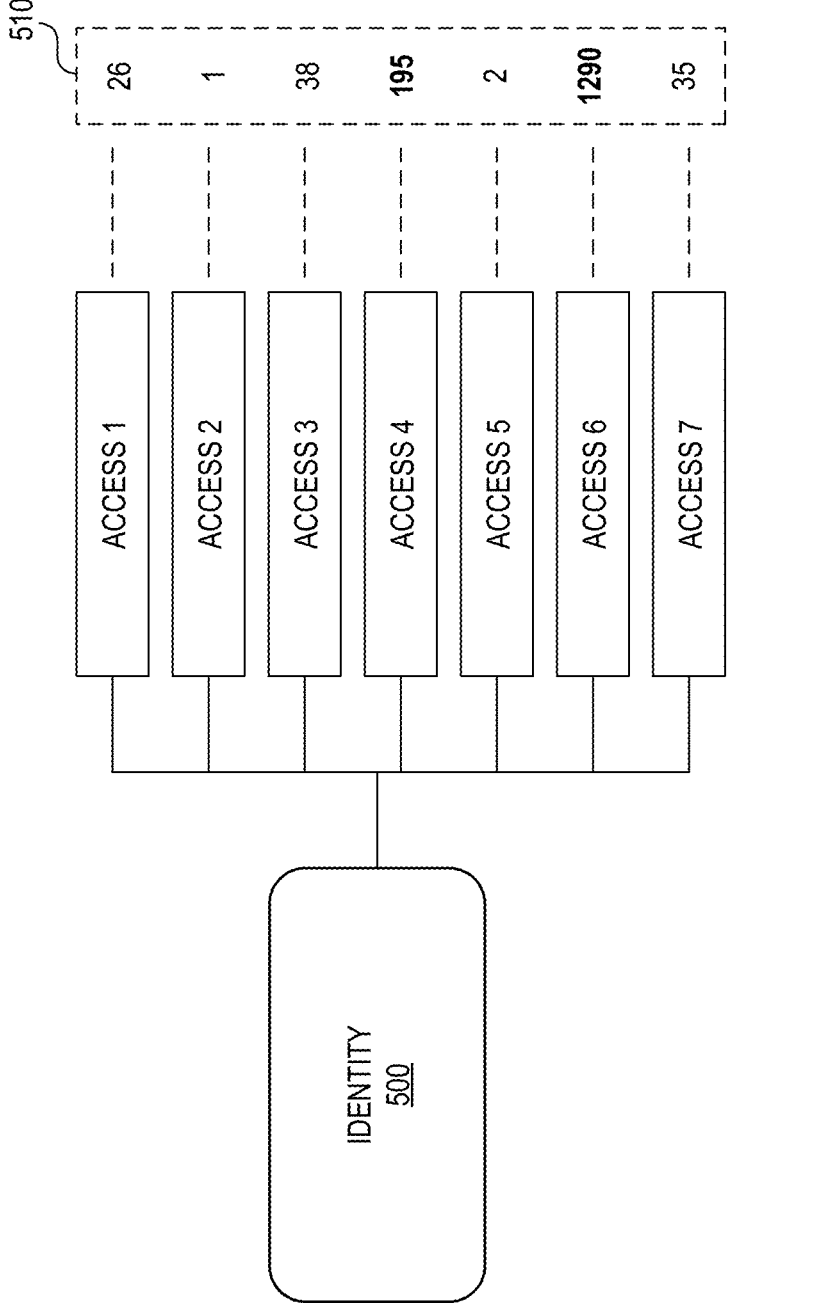
FIG. 5 shows sample assignment of access in which multiple accesses are assigned to an identity.

FIG. 5 shows sample assignment of access in which multiple accesses are assigned to an identity. The identity 500 can have multiple accesses, such as seven accesses as shown in FIG. 7. Each access can include multiple readers that can authorize the identity 500. The system can track the number of days since last usage as shown in column 510. When the number of days since last usage is greater than a predetermined threshold, such as 180 days, the system can determine that the access is not in use by the identity 500. For example, access 4 has not been used in 195 days, and access 6 has not been used in 1290 days by identity 500. In addition to identity 500, there can be thousands more identities with access 4 and 6. To compute the health score of access 4 and 6, the system can determine how many identities having the access 4 and 6 are using it actively. For example, if 50% of all the identities are using access 4, and 60% of all the identities are using access 6, the health scores for access 4 and 6 are 50% and 60% respectively.

Figure 6:
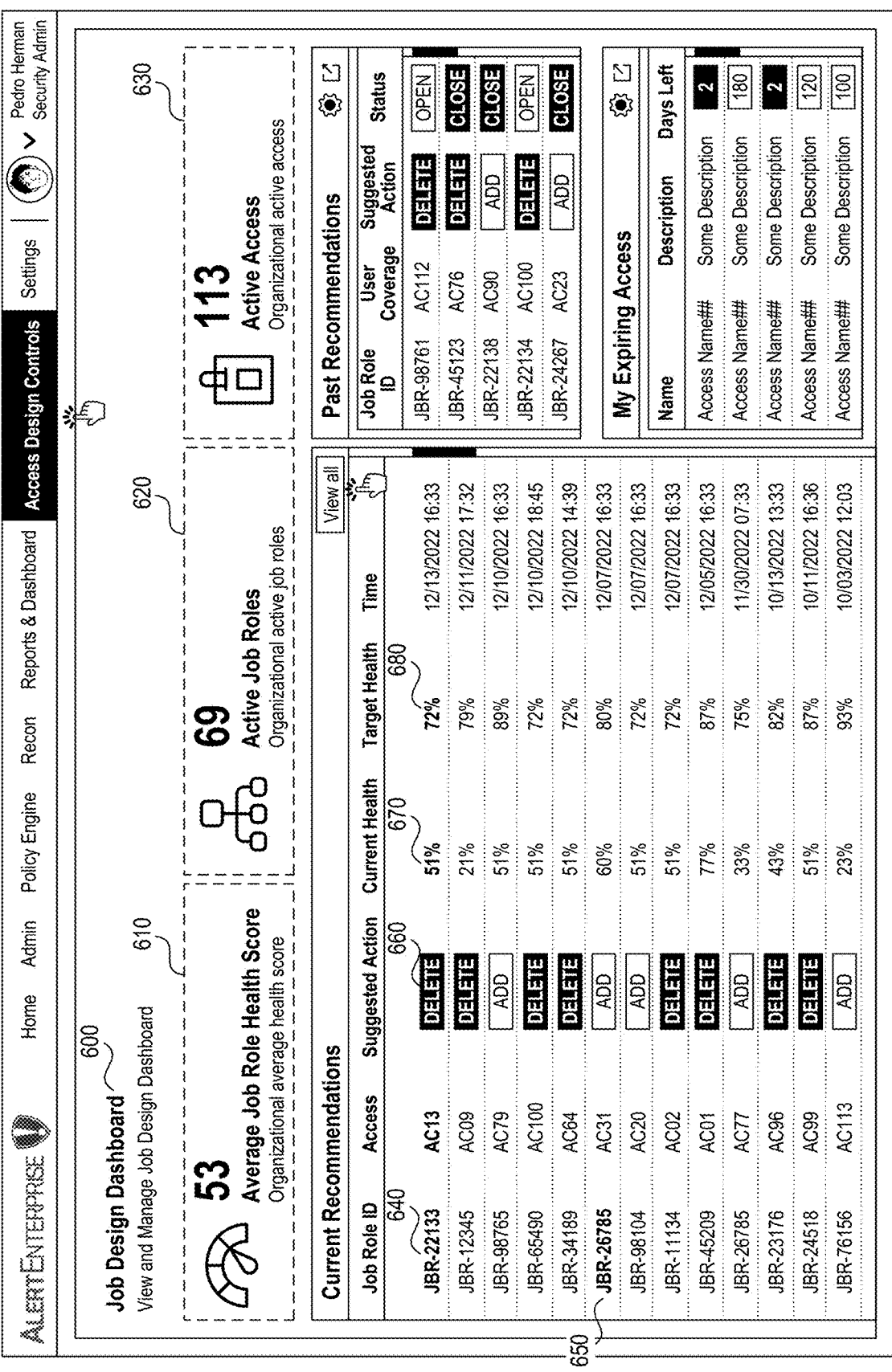
FIG. 6 shows a sample dashboard that includes recommendations on a job role.

FIG. 6 shows a sample dashboard 600 including recommendations for a job role. Element 610 shows that an average health score of job roles in an organization is 53%. Element 620 shows that there are 69 active job roles, and element 630 shows that there are 113 active accesses. Element 640, 650 (only two are labeled in FIG. 6 for brevity) shows recommendations associated with job roles JBR-22133, JBR-26785. Column 660 shows the suggested action, column 670 shows the current health, and column 680 shows the target health that is achieved once the suggested action is performed. For example, the health score of element 640 is 51%. The suggested action indicates to delete the access AC13, which improves the health score to 72%.

FIG. 7 shows one type of suggestion, namely, creating a new job role grouping for more than one recommended access. The user interface 700 lists multiple suggestions 710, 720 (only two are labeled in FIG. 7 for brevity), where each suggestion 710, 720 lists a job role shown in column 730. Column 740 shows suggested multiple accesses. Column 750 shows the target health score of the job role. For example, suggestion 710 indicates to combine accesses AC13, AC11, AC15 and create a new job role ID JBR-12345, which has a health score of 72. The recommendations' raw content is generated by the statistical layer, e.g. which entity to change, what is the change, and what would be the benefit. This raw data is combined with the text template stored in the database and is served in the form of natural language recommendations to the end user.

Figure 8:
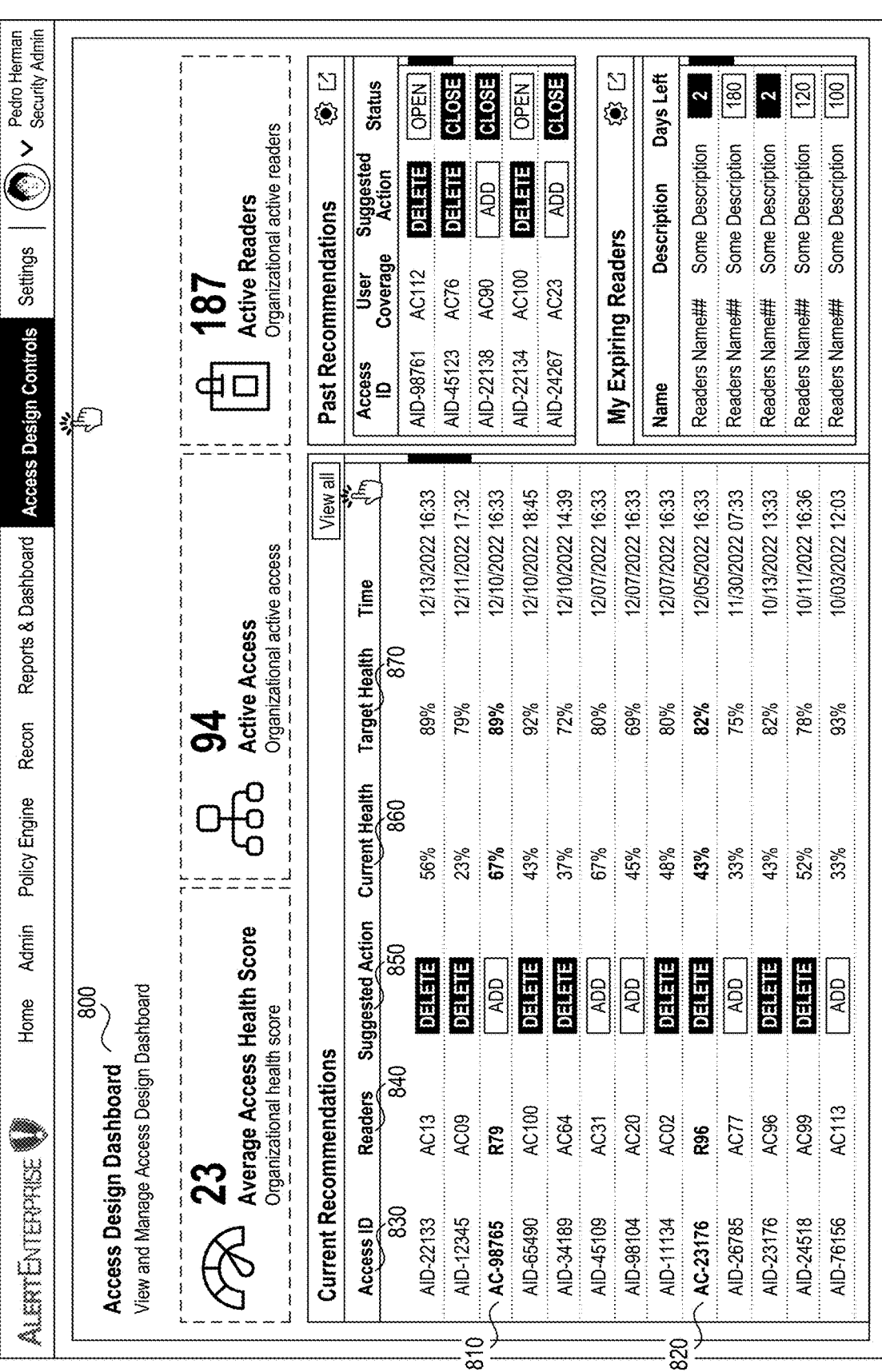
FIG. 8 shows another type of suggestion, namely, granting or revoking a reader's access.

FIG. 8 shows another type of suggestion, namely, removing or adding a reader to an access. The user interface 800 lists multiple suggestions 810, 820 (only two are labeled in FIG. 8 for brevity), where each suggestion lists an access in column 830, a reader in column 840, a suggested action in column 850, the current health score in column 860, and a target health score in column 870. For example, suggestion 810 indicates that adding a reader R79 from access AC-98765 increases the current health score of the access AC-98765 from 67% to the target health score of 89%. Similarly, suggestion 820 indicates that removing the reader R96 from access AC-23176 increases the health score of the access AC-23176 from 43% to 82%.

Insights on Statistical Layer

An embeddings based approach is used to rearrange or create new access levels and roles.

Generate Embeddings: Use embedding techniques, e.g. Word Embeddings or Neural Embeddings, to represent access levels/job roles in a high-dimensional space. This creates vector representations that capture the relationships between different access levels or job roles, respectively. Embeddings capture intricate relationships and nuances that may not be adequately represented in lower-dimensional spaces and are useful in finding insights such as semantic similarity which provide more precision while executing linear optimization and doing similarity analysis.

Study the latent space: Use the embedded representations to explore the latent space. This involves analyzing the relationships between access levels and job roles to identify patterns and clusters. Visualization tools such as t-SNE or PCA can help in understanding the structure of the latent space.

Generative model training: A generative model, e.g. Generative Adversarial Network or Variational Autoencoder, learns the underlying patterns in the data and generates new configurations of access levels and job roles leveraging the similarity between the access levels and job roles respectively as the basis. The model is fine-tuned guided with the samples of the ideal desired output for better accuracy.

Linear optimization based upon embeddings: This involves defining objective function, i.e. minimize abandoned access levels and job roles, defining constraints such as job role requirements, access group dependencies, and limitations on the number of access levels an individual can have, formulate the model, and then solve it. The method enhances physical security, employing access for nuanced alignment and optimal utilization.

Computer Implementation

Figure 9:
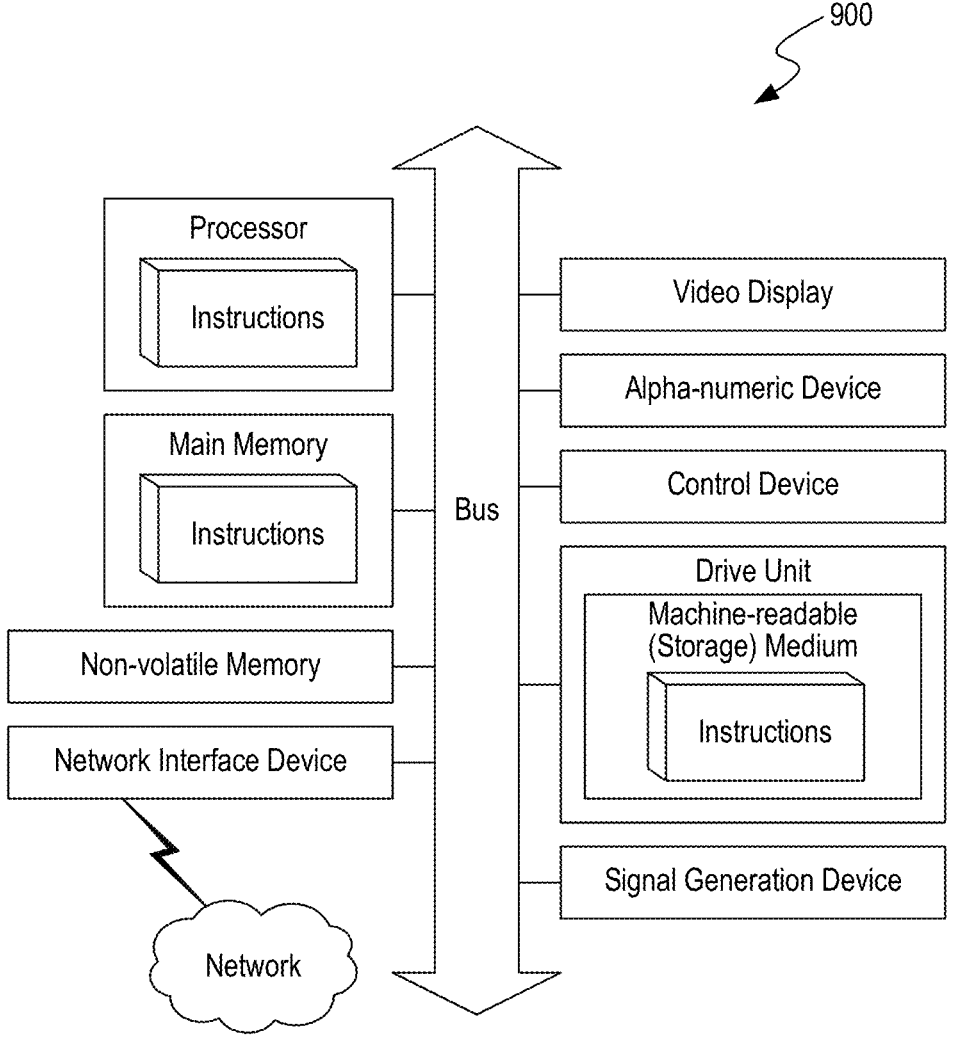
FIG. 9 is a diagrammatic representation of a machine in the example form of a computer system within which a set of instructions, for causing the machine to perform any one or more of the methodologies or modules discussed herein, may be executed.

FIG. 9 is a diagrammatic representation of a machine in the example form of a computer system 900 within which a set of instructions for causing the machine to perform any one or more of the methodologies or modules discussed herein may be executed.

In the example of FIG. 9, the computer system 900 includes a processor, memory, non-volatile memory, and an interface device. Various common components, e.g. cache memory, are omitted for illustrative simplicity. The computer system 900 is intended to illustrate a hardware device on which any of the components described in the example of FIGS. 1-8 (and any other components described in this specification) can be implemented. The computer system 900 can be of any applicable known or convenient type. The components of the computer system 900 can be coupled together via a bus or through some other known or convenient device.

This disclosure contemplates the computer system 900 taking any suitable physical form. As example and not by way of limitation, computer system 900 may be an embedded computer system, a system-on-chip (SOC), a single-board computer system (SBC) (such as, for example, a computer-on-module (COM), or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these.

Where appropriate, computer system 900 may: include one or more computer systems 900; be unitary or distributed; span multiple locations; span multiple machines; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

The processor may be, for example, a conventional microprocessor such as an Intel Pentium microprocessor or Motorola power PC microprocessor. One skilled in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The nonvolatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 900. The nonvolatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing and entire large program in memory may not even be possible. Nevertheless, it should be understood that for software to run, if necessary, it is moved to a computer readable location appropriate for processing, and for illustrative purposes, that location is referred to as the memory in this application. Even when software is moved to the memory for execution, the processor will typically make use of hardware registers to store values associated with the software and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 900. The interface can include an analog modem, ISDN modem, cable modem, token ring interface, satellite transmission interface (e.g., direct PC), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 9 reside in the interface.

In operation, the computer system 900 can be controlled by operating system software that includes a file management system, such as a disk operating system. One example of operating system software with associated file management system software is the family of operating systems known as Windows® from Microsoft Corporation of Redmond, Washington, and its associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying," "generating," or the like refer to the action and processes of a computer system or similar electronic computing device that manipulates and transforms data represented as physical (electronic) quantities within the computer system's registers and memories into other data similarly represented as physical quantities within the computer system's memories or registers or other such information storage, transmission, or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a stand-alone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch, or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media, e.g. a centralized or distributed database, and/or associated caches and servers, that store the one or more sets of instructions. The terms "machine-readable medium" and "machine-readable storage medium" shall also be taken to include any medium that is capable of storing, encoding, or carrying a set of instructions for execution by the machine and that causes the machine to perform any one or more of the methodologies or modules of the presently disclosed technique and innovation.

In general, the routines executed to implement the embodiments of the disclosure may be implemented as part of an operating system or a specific application, component, program, object, module, or sequence of instructions referred to as "computer programs." The computer programs typically comprise one or more instructions set at various times in various memory and storage devices in a computer and, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks, e.g. Compact Disk Read-Only Memory (CD ROMS), Digital Versatile Disks, (DVDs), etc., among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state.

Thus, for example, non-transitory refers to a device remaining tangible despite this change in state.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

The invention claimed is:

1. A computer-implemented method comprising:
with a processor comprising a memory:
obtaining an access, a role, and an identity, wherein a first access includes a reader guarding content, wherein the role includes a first plurality of accesses including the first access, wherein the identity is associated with an entity configured to seek access to the content, and wherein the identity corresponds to the role;
obtaining multiple events indicating an interaction between the identity and the reader, and a time of the interaction;
determining a health score for each access among the first plurality of accesses associated with the role, wherein the health score is negatively correlated to a passage of time since the time of the interaction to obtain multiple health scores;
determining a health score associated with the role based on the multiple health scores;
determining whether that the health score associated with the role can be increased by performing a change including removing one or more accesses from the first plurality of accesses, adding a second access to the first plurality of accesses associated with the role, or creating a new role grouping a second plurality of accesses; and
upon determining that the health score associated with the role can be increased, suggesting the change increasing the health score,
obtaining a token from job role and access combinations;
using said token to monitor health of an access with respect to a particular job role;
providing said token, access data, and the health score to a statistical layer;
said statistical layer processing said token, access data, and the health score;
said statistical layer optimizing a resultant health score for the token using linear optimization; and
responsive thereto, said statistical layer generating recommendations.

2. A method for determining security risks, comprising:
with a processor comprising a memory:
providing a hierarchical structure defining a relationship between one or more readers, one or more accesses, and one or more job roles;
organizing said readers into groups comprising accesses having access levels based on identities who use the readers, wherein said accesses are organized into job roles, wherein there are one or more accesses in a job role, and wherein there are one or more readers in an access;
creating a log when a reader is accessed by an identity and storing said log as an event;
using events to quantify usage levels of readers, accesses, and job roles;

calculating a health score based on said events, wherein the health score of a job role and/or access is directly proportional to usage levels of said job role and/or access;

based on the health score, revising access in a job role to reduce exposure and risk level;

obtaining a token from job role and access combinations;

using said token to monitor health of an access with respect to a particular job role;

providing said token, access data, and the health score to a statistical layer;

said statistical layer processing said token, access data, and the health score;

said statistical layer optimizing a resultant health score for the token using linear optimization; and responsive thereto, said statistical layer generating recommendations.

3. The method of claim 2, further comprising:

said readers reading a presented identity and determining whether the presented identity is authorized to access content guarded by the reader.

4. The method of claim 3, further comprising:

said readers using any of knowledge, possession, and/or biometrics to authorize an identity.

5. The method of claim 4:

wherein knowledge comprises knowledge of a password;

wherein possession comprises possession of a key; and wherein biometrics comprise any of fingerprints, retina scans, and voice authentication.

6. The method of claim 3, further comprising:

once the identity is authenticated, said readers allowing any of opening of a door, access to privileged information, and ability to perform secured operations.

7. The method of claim 2:

wherein an identity comprises more than one job role and vice versa;

wherein an identity comprises more than one access and vice versa;

wherein an identity is associated with any of a person, a program, or any entity that accesses protected content; and wherein an identity is prevented from obtaining permission to use assets that the identity does not need to use.

8. The method of claim 2, further comprising:

granting privileges at readers to the identities by assigning any of job roles and access to said identities.

9. The method of claim 8, further comprising:

capturing multiple logs for an individual identity and/or for an individual reader.

10. The method of claim 9, further comprising:

generating one or more recommendations to improve the health score of the job roles by any of:

rearranging the accesses in the job roles;

removing or adding an access to a job role; and creating a new job role grouping more than one recommended access.

11. The method of claim 9, further comprising:

generating one or more recommendations to improve the health score of the accesses by any of:

removing or adding new readers to the accesses; and creating new access by grouping more than one recommended reader.

12. A method for determining security risks, comprising:

with a processor comprising a memory:

organizing one or more readers into groups comprising accesses having access levels based on identities who use the readers, wherein said accesses are organized into job roles, wherein there are one or more accesses in a job role, and wherein there are one or more readers in an access;

granting privileges at readers to identities by assigning job roles and access to said identities;

creating a log when a reader is accessed by an identity and storing said log as an event, wherein events record recency and frequency of access usage;

using events to quantify usage levels of readers, accesses, and job roles;

using job role, access, events, and identity data to generate a health score;

obtaining a token from job role and access combinations;

using said token to monitor health of an access with respect to a particular job role;

providing said token, access data, and the health score to a statistical layer;

said statistical layer processing said token, access data, and the health score;

said statistical layer optimizing a resultant health score for the token using linear optimization; and responsive thereto, said statistical layer generating recommendations.

13. The method of claim 12, wherein said health score comprises a quantified representation of a level up to which a current access is being used by the identities.

14. The method of claim 12, further comprising:

categorizing an identity that has not used an access for more than a threshold period as non-active usage; and generating a lower health score for said non-active usage.

15. The method of claim 12, further comprising:

calculating a proportion of active usage as a percentage to determine a health score of a specific access.

16. The method of claim 12, further comprising:

calculating specific health score of an access; and averaging the health score for each access in a job role to determine the job role's health score.

17. The method of claim 12, further comprising:

generating one or more recommendations to improve the health score.

18. The method of claim 17, further comprising:

said one or more recommendations suggesting removal of an access that has a lesser score to improve an overall job role health score.

19. The method of claim 12, wherein the health score comprises a single quantifiable number for every job role; and further comprising:

determining the health of an organization by averaging health scores of all job roles to obtain a total health score for said organization.

20. The method of claim 12, wherein said recommendations comprise any of:

adding or removing an access from a job role to increase health scores; and designing a new job role to maximize respective health scores.

21. The method of claim 12, further comprising:

sending user actions including approving the recommendations back to a job role repository as commands that make changes in respective job roles to improve a median health score of job roles and reduce risk levels of an organization from unnecessary privilege, which could otherwise lead to insider threats.

22. The method of claim 12, further comprising:

said statistical layer generating the recommendations for job roles and assembling said recommendations to maximize the health score by:

classifying and ranking high-risk job roles, wherein job roles that have lowest health scores and involve sensitive access and readers are ranked higher;

editing recommendations by finalizing removal and addition of recommendations based upon closest matches of job roles in view of said ranking; and using a similarity algorithm to find best groups based upon access definition and historical usage.

23. The method of claim 12, further comprising:

using a job role design process to edit or create accesses to optimize job role design to achieve maximum health score for job roles; and using an access design process to optimize an access either by editing the access to adjust the readers in the access or by creating new accesses by grouping readers based upon recommendations generated by statistical layer.

24. The method of claim 12, further comprising:

coupling two or more accesses, wherein a second access can only be reached after a first access has authorized the identity.

25. The method of claim 24, further comprising:

keeping a table of coupled accesses.

26. The method of claim 25, further comprising:

when removal of one access from a job role is recommended, also recommending removal of a coupled access.

27. The method of claim 12:

wherein the identity comprises multiple accesses; and wherein each access comprises multiple readers that can authorize the identity.

28. The method of claim 27, further comprising:

tracking a number of days since a last usage;

when the number of days since the last usage is greater than a predetermined threshold, determining that the access is not in use by the identity; and determining how many identities having an access are using the access actively to compute the health score of the access.

29. The method of claim 12, further comprising:

providing a dashboard comprising any of recommendations for a job role, an average health score of job roles in an organization, active job roles, active accesses, recommendations associated with job roles, a suggested action, current health, and target health that is achieved once a suggested action is performed.

\* \* \* \* \*